(12) United States Patent
Kim

(10) Patent No.: US 12,320,450 B2
(45) Date of Patent: Jun. 3, 2025

(54) PIPE FITTING APPARATUS PROVIDING EASY LOCKING WITH APPROPRIATE TORQUE

(71) Applicant: Brian Kim, Flower Mound, TX (US)

(72) Inventor: Brian Kim, Flower Mound, TX (US)

(*) Notice: Subject to any disclaimer, the term of this patent is extended or adjusted under 35 U.S.C. 154(b) by 0 days.

(21) Appl. No.: 17/919,981

(22) PCT Filed: May 20, 2022

(86) PCT No.: PCT/US2022/030388
§ 371 (c)(1),
(2) Date: Oct. 19, 2022

(87) PCT Pub. No.: WO2022/251078
PCT Pub. Date: Dec. 1, 2022

(65) Prior Publication Data
US 2024/0209967 A1    Jun. 27, 2024

Related U.S. Application Data

(60) Provisional application No. 63/193,023, filed on May 25, 2021.

(51) Int. Cl.
*F16L 19/00* (2006.01)
*F16B 39/12* (2006.01)
*F16B 39/36* (2006.01)

(52) U.S. Cl.
CPC ............ *F16L 19/005* (2013.01); *F16B 39/12* (2013.01); *F16B 39/36* (2013.01); *F16L 2201/20* (2013.01)

(58) Field of Classification Search
CPC . F16L 19/005; F16L 2201/20; F16L 2201/10; F16L 19/0218; F16L 19/0231;
(Continued)

(56) References Cited

U.S. PATENT DOCUMENTS 406,060 A  * 7/1889 Potts .................... F16L 19/04
4,919,455 A  * 4/1990 Yoshiro
(Continued)

FOREIGN PATENT DOCUMENTS

GB             914094 A  * 12/1962
KR      2010000913 U  * 1/2010

OTHER PUBLICATIONS

KR-2010000913-U—Machine Translation—English (Year: 2010).*

*Primary Examiner* — William S. Choi
(74) *Attorney, Agent, or Firm* — Sul Lee

(57) ABSTRACT

A pipe fitting apparatus provides easy locking with an appropriate torque for which the possibility of breakage and leakage has been eliminated by being easily configured in a manner that the locking of the pipe fitting apparatus used to connect pipes is performed with an appropriate torque. The pipe fitting apparatus has a fitting body, a force control ferrule, and a fixing nut. The fitting body has a first connecting portion with an inner threaded surface, a second connecting portion having an outer threaded portion, and a ferrule seating portion where the force control ferrule is provided. The fixing nut has an inner threaded portion for engaging with the second connecting portion of the fitting body and an inclined pressure surface for abutting against the force control ferrule.

3 Claims, 3 Drawing Sheets

(58) Field of Classification Search
CPC ..... F16L 19/0283; F16L 19/04; F16L 19/043;
F16L 19/08; F16L 19/06; F16B 39/12;
F16B 39/36
See application file for complete search history.

(56) References Cited

U.S. PATENT DOCUMENTS

| | | | |
|---|---|---|---|
| 5,280,967 A * | 1/1994 | Varrin, Jr. | |
| 6,142,535 A * | 11/2000 | Nishio | ................ F16L 19/005 |
| 6,640,457 B2 * | 11/2003 | Williams | |
| 8,398,124 B2 * | 3/2013 | Bennett | |
| 2006/0157975 A1 * | 7/2006 | Fujii | |
| 2008/0315582 A1 * | 12/2008 | Levy | |
| 2011/0277309 A1 * | 11/2011 | Bearer | ................... F16L 15/04 |
| 2012/0005878 A1 * | 1/2012 | Rubinski | |
| 2019/0309879 A1 * | 10/2019 | Kim | ........................ F16L 19/08 |
| 2019/0331263 A1 * | 10/2019 | Langer | ................ F16L 19/005 |

\* cited by examiner

PIPE FITTING APPARATUS PROVIDING EASY LOCKING WITH APPROPRIATE TORQUE

TECHNICAL FIELD

The present disclosure relates to a pipe fitting for providing easy locking with an appropriate torque, for which the possibility of breakage and leakage has been virtually eliminated by being easily configured in a manner such that the locking of the pipe fitting apparatus used to connect pipes is performed with an appropriate torque.

BACKGROUND ART

In general, piping is carried out by arranging pipes on the transfer path to transfer gas or fluid from one point to another without loss.

For piping, it is practicably difficult to manufacture a pipe of a very long distance in a single piece, so a method for piping a required distance by providing a large number of pipes of a certain length and connecting each pipe is commonly used.

However, the method of piping by coupling each pipe by welding, which has been used in the past, had disadvantages in that it requires professional skills of an expert, requires tools for welding, there is a risk of fire that may occur during welding due to high temperature, and the work takes time.

In order to address such disadvantages, a pipe fitting apparatus that can fasten between a pipe and a pipe with a nut has been developed, but the biggest problem with the pipe fitting apparatus was achieving stability to prevent leakage between each pipe being connected.

In particular, the existing pipe fitting apparatus adopting the nut fastening method has a problem of poor safety, such as the nut being tightened stronger than the appropriate value to apply strong pressure, leading to internal damage, causing leakage, and tightening the nut more loosely than that of the appropriate value due to concerns about breakage, causing leakage.

Although the nut can be tightened to an appropriate value using a torque gauge, there was the inconvenience of having to install a torque gauge each time they are connected, the hassle of having to separately prepare a torque gauge, and the difficulty in having to apply various appropriate torque values for each pipe.

SUMMARY

The present disclosure is directed to providing a pipe fitting apparatus that does not require a separate flare packing and can be locked easily with an appropriate torque for which the possibility of breakage and leakage has been eliminated due to the fact that it can be easily locked with an appropriate torque and without a torque gauge.

The object of the present disclosure is not limited to the object described above, and other objects not mentioned will be clearly understood from the descriptions below.

According to an embodiment, a pipe fitting apparatus for providing easy locking with an appropriate torque, according to the present disclosure, includes a flare socket having a screw thread formed on the outer circumferential surface and an inclined surface formed at one end so that a flare joint is made: a fitting body in which the inner circumferential surface on one side is screwed into the screw thread of the flare socket, the pipe is inserted into the inner circumferential surface on the other side, and a screw thread is formed on the outer circumferential surface; a fixing nut screwed to the outer circumferential surface on the other side of the fitting body: and a force control ferrule that is inserted and installed between the fitting body and the fixing nut, allowing the fitting body and the fixing nut to be locked with an appropriate amount of locking torque.

According to an embodiment, a pipe fitting apparatus has a fitting body comprising a first connecting portion having an inner threaded surface at a first end, a second connecting portion having an outer threaded portion, and a ferrule seating portion; a force control ferrule on the ferrule seating portion of the fitting body; and a fixing nut comprising an inner threaded portion for rotatably engaging with the second connecting portion of the fitting body and an inclined pressure surface for abutting against the force control ferrule.

According to an embodiment, the outer circumferential surface of the fitting body has a polygonal outer cross-sectional shape.

According to an embodiment, the ferrule seating portion is between the first connecting portion and the second connecting portion.

According to an embodiment, the second connecting portion is between the first connecting portion and the ferrule seating portion.

According to an embodiment, one end of the pipe in contact with the flare socket is formed by being extended to a relatively larger diameter compared to the pipe so as to be in contact with the inclined surface of the flare socket.

According to an embodiment, a locking nut and a locking ferrule are further provided, and the second fitting body further has a locking connecting portion having an outer threaded portion for engaging with the locking nut and an inclined locking portion for engaging with the locking ferrule.

EFFECTIVE OF INVENTION

The following effects can be expected in the present disclosure having the configuration described above.

In the conventional pipe fitting apparatus, it was impossible to know the appropriate amount of torque when inserting the pipe and locking the fixing nut for the fitting, but it became possible, by the present disclosure, to lock the fixing nut with an appropriate locking torque, which can significantly reduce the possibility of leakage of gas or fluid.

Because the most important role of the pipe fitting apparatus is preventing leakage of gas or fluid, there is a tendency to lock more strongly than is generally needed for the appropriate amount of locking torque, causing pipe damage or breakage. The embodiments in the present disclosure help provided appropriate locking torque to present such damage.

In particular, considering that pipes are generally installed underground or consist of very narrow pipelines, replacing or repairing them can be very complex, but since, due to the present disclosure, the pipes are not damaged, it can be said that the effect of reducing the time and cost required for maintenance is very significant.

Since the pipe is formed with an expanded end, it may be possible to tightly couple it to the flare socket easily without a separate flare packing.

Since there is no need for a torque gauge to measure the amount of locking torque and there is no need for a separate flare packing and so forth for flare joints, there is no need for effort to provide additional tools or materials for the work, and since there is also no possibility of suspension and so

DETAILED DESCRIPTION

Hereinafter, the pipe fitting apparatus providing easy locking with an appropriate torque according to a preferred embodiment of the present disclosure will be described in detail with reference to the accompanying figures as follows.

Figure 1:
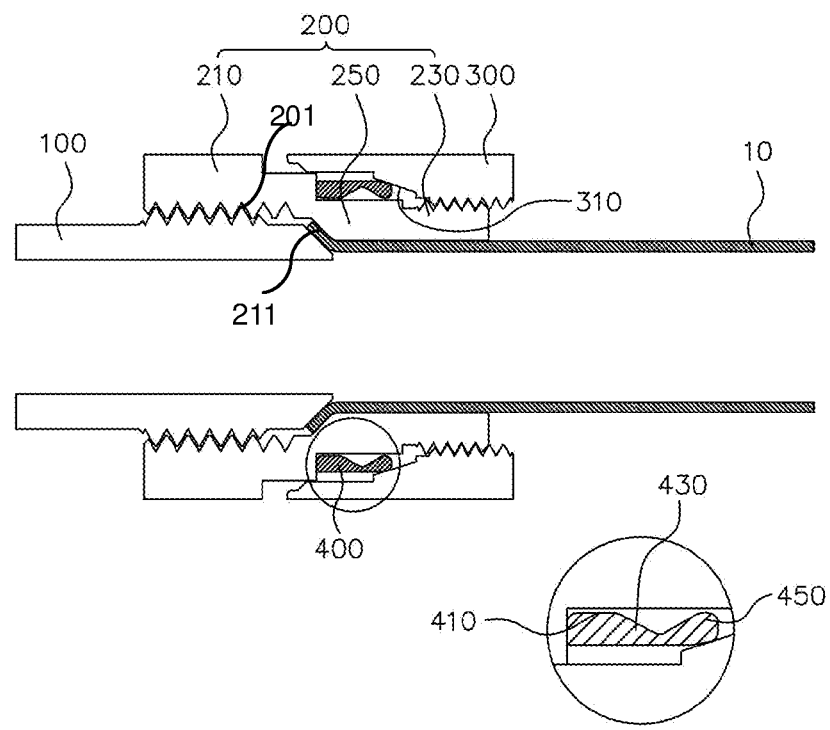
FIG. 1 is a section view of a pipe fitting apparatus providing easy locking with an appropriate torque according to an embodiment of the present disclosure.

According to an embodiment, a pipe fitting apparatus for providing easy locking with an appropriate torque includes a flare socket (100), a fitting body (200), a fixing nut (300), and a force control ferrule (400) as shown in FIG. 1, and since each component has technical characteristics, a description will be made for each component below.

First, some embodiments of the flare socket (100) will be described.

The flare socket (100) is a component inserted into one side of a fitting body (200) to be described later, and may be an end portion of a pipe that needs to be fitted or may be a component coupled to the end of the pipe.

The flare socket (100) may have a threaded portion (101) formed on the outer circumferential surface and be screwed to one side of the fitting body (200) that has a complementary threaded portion (201) formed on the inner circumferential surface. According to an embodiment, the outer surface of the flare socket (100) may be a tubular (i.e. cylindrical) type so that smooth screwing can be achieved.

The flare socket (100) may have an inclined flare surface (110) formed at one end to achieve a flare joint, with the pipe (10) having a complementary end inserted into the other side of the fitting body (200).

The flare joint may refer to a form of coupling in which an inclined surface is formed at one end (e.g. a convex shaped end), and the other end coupled thereto is configured in a form that is expanded in the form of a bell or a trumpet (e.g. a concave shaped end) so that the inclined surface is inserted and in contact with the surface to achieve airtightness through tight coupling.

The threaded portion (101) of the flare socket (100) and the inclined flare surface (110) are spaced apart to minimize interference between the threaded portion 101 and the inclined flare surface (110) when the flare socket (100) is screwed to the fitting body (200). According to an embodiment, the threaded portion 101 is spaced apart from the inclined surface (110) or adjacent to the inclined flare surface (110).

Next, certain embodiments of the fitting body (200) will be described.

According to an embodiment, fitting body (200) serves to form a support that is entirely sealed at a portion where the flare socket (100) and the pipe (10) come into contact to achieve a firm fitting.

The flare socket (100) may be inserted and screwed into one side of the fitting body (200), and a pipe (10) may be inserted through the other side of the fitting body (200) or through the same side of the fitting body (200) as the flare socket (100) prior to inserting the flare socket (100). According to an embodiment, the pipe (10) may have an expanded end portion (11) that abuts against an inner inclined surface (270) of the fitting body (200).

According to an embodiment, the fitting body (200) includes a first connecting portion (210), a second connecting portion (230), and a ferrule seating portion (250).

The first connecting portion (210) of the fitting body (200) is formed on the side to which the flare socket (100) is inserted and coupled, and the outer circumferential surface (i.e. the outer cross-sectional shape) may be formed in a polygonal shape to ensure that it gets firmly screwed with the flare socket (100) by using a wrench to rotate the fitting body (200). The threaded portion (201) for rotatably engaging with the outer threaded portion (101) of the flare socket (100) is formed on the inner surface of the first connecting portion (210).

The second connecting portion (230) of the fitting body (200) has a threaded portion on an outer circumferential surface such that a fixing nut (such as fixing nut (300) to be described later) with a corresponding inner threaded portion can be coupled, and may be configured in a form having relatively smaller inner and outer diameters compared to those of the first connecting portion (210). Because the fixing nut (300) needs to be rotated and be screwed onto the second connection portion (230), the outer circumferential surface has a tubular (i.e. cylindrical) shape. According to an embodiment, the second connection portion (230) may be formed at a lateral distance from the end of the fitting body that faces the flare socket. According to the embodiment illustrated in FIG. 1, the second connection portion (230) is formed proximate to the end of the fitting body (200) that is on the side that is opposite to the first connecting portion such that the ferrule seating portion (250) is between the first connecting portion (210) and the second connecting portion (230).

The fitting body (200) further has an inner inclined surface (211) in which its incline angle corresponds to the inclined flare surface (110).

The ferrule seating portion (250) serves to accommodate and position a force control ferrule (400) (to be described later), and its outer diameter is configured to be the same as the inner diameter of the seat (410) of the force control ferrule (400), which can prevent the force control ferrule (400) from being separated due to fitting the force control ferrule (400).

In addition, there is a wall surface at one end of the ferrule seating portion (250) that is perpendicular to the axis of the fitting body (200) by forming a step with the first connecting portion (210) (or the second connecting portion (230) according to an embodiment), such that an end of the of the force control ferrule (400) that is proximate to the seat (410) abuts against the wall surface. The wall surface facilitates compressive deformation of the force control ferrule (400)

by restricting its movement in the axial direction of the fitting body (200) when the seated force control ferrule (400) receives an external force.

The location of the ferrule seating portion (250) on the fitting body (200) may be determined according to the shape of the fitting body (200) and the fixing nut (300). According to an embodiment as shown in FIG. 1, the ferrule seating portion (250) and may be between the first connecting portion (210) and the second connecting portion (230). According to an embodiment as shown in FIG. 2, the ferrule seating portion (250) may be at a positon separated from the first connecting portion (210) but adjacent the second connecting portion (230) such that it extends to end of the fitting body (200) opposite to the end that proximate to the first connecting portion (210).

The first connecting portion (210), the second connecting portion (230), and the ferrule seating portion (250) can be distinguished based on the outer circumferential surface of the fitting body (200). For example, in the embodiments shown in FIGS. 1 and 2, the first connecting portion (210) has the largest outer circumference with a smooth outer surface as the threaded surface is in the inner surface; the second connecting portion (230) has a smaller outer circumference than the first connecting portion (210) and a threaded outer circumferential surface engaging with a fixing nut; and the ferrule seating portion (250) also has a smaller outer circumference than the first connecting portion (210) and a smooth other circumferential surface for accommodating a ferrule. According to an embodiment as shown in FIG. 1 in which the ferrule seating portion (250) is between the first connecting portion (210) and the second connecting portion (230), the outer circumference of the ferrule seating portion (250) is the same as or greater than the widest circumference of the second connecting portion. As already discussed, there is a vertical wall surface perpendicular to the axial direction of the fitting body (200) which forms one step portion between the first connecting portion (210) and the ferrule seating portion (250). According to an embodiment as shown in FIG. 1, there may be an additional step portion between the first connecting portion (210) and the ferrule seating portion (250).

Figure 2:
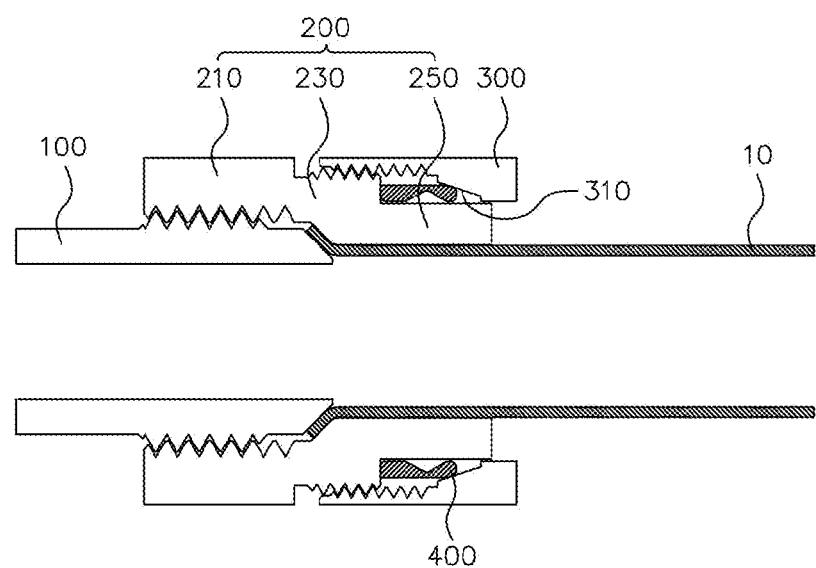
FIG. 2 is a section view of a pipe fitting apparatus providing easy locking with an appropriate torque according to another embodiment of the present disclosure.
Figure 3:
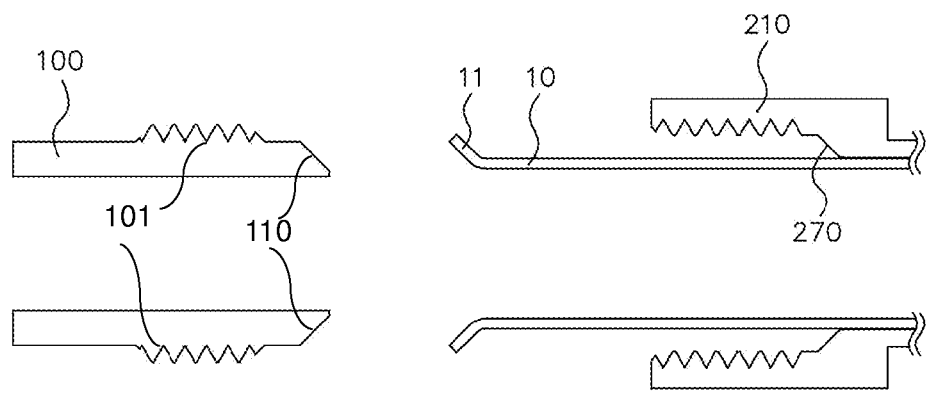
FIG. 3 is a section view of a coupling process of a pipe formed with an expanded portion according to an embodiment of the present disclosure.
Figure 4:
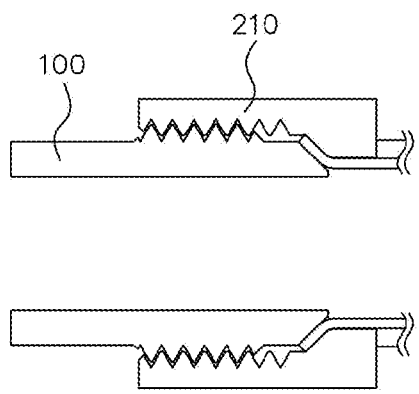
FIG. 4 is a section view of a coupled state of a pipe formed with an expanded portion according to an embodiment of the present disclosure.

According to an embodiment as shown in FIG. 2 in which the second connecting portion (230) is between the first connecting portion (210) and the ferrule seating portion (250), the outer circumference of the ferrule seating portion (250) is narrower than the narrowest outer circumferential diameter of the second connecting portion (230). The perpendicular wall surface described earlier forms a step boundary where the one end of the ferrule seating portion (250) abuts the second connecting portion (230). As shown in FIG. 2, there is at least one step boundary between the second connecting portion (230) and the first connecting portion.

The inner circumferential surfaces of the fitting body (200) can be tailored according to the shape or size of the component to be inserted and coupled.

According to an embodiment, the inner circumferential surface on the inside of the first connecting portion (210) is formed to have the same size as the outer diameter of the flare socket (100), with a threaded surface to allow the flare socket (100) to be rotatably inserted into the first connecting portion (210). According to an embodiment as shown in FIG. 1, the inner circumferential surface on the inside of the second connecting portion (230) may be formed to have the same size as the outer diameter of the pipe (10) to leave no meaningful gap, which allows it to be sealed such that no gas or fluid inside the fitting body (200) can be leaked into the open space.

According to an embodiment, the inner circumferential surface on the inside of the first connecting portion (210) and the inner circumferential surface on the inside of the second connecting portion (230) having different inner diameters may have an inner inclined surface (270) in between. According to an embodiment, the inclination angle of the inner inclined surface (270), the inclined surface formed at one end of the flare socket (100), and the inclination angle of the expanded portion (11) of the pipe (10) all coincide with each other to facilitate a tight seal.

Next, some embodiments of the fixing nut (300) will be described.

The fixing nut (300) is rotatably coupled to the fitting body (200) via the second connecting portion (230) of said fitting body (200).

According to an embodiment, the outer surface of the fixing nut (300) is cross-sectionally formed into a polygonal shape to allow it to be rotatably fastened using a wrench in the same manner as the first connecting portion (210) of the fitting body (200). According to an embodiment, the outer surface of the fixing nut (300) is formed to be flush with the outer surface of the first connecting portion (210) of the fitting body (200), and when locking, the outer circumferential surface of the fixing nut (300) and the outer circumferential surface of the first connecting portion (210) of the fitting body (200) can be positioned on the same plane (i.e. in an embodiment, the fixing nut (300) and the first connecting portion (210) have the same cross-sectional shape and area).

According to an embodiment, the inner circumferential surface of the fixing nut (300) has a threaded portion for allowing the fixing nut (300) to be rotatably coupled onto a corresponding outer threaded surface of the second connecting portion (230) of the fitting body (200).

As described above, the location and depth of the inner threaded portion of the fixing nut (300) may vary according to the relative positions of the ferrule seating portion (250) and the second connecting portion (230) of the fitting body (200) according to the embodiment that is being utilized.

For example, when the ferrule seating portion (250) is positioned between the first connecting portion (210) and the second connecting portion (230) (as shown in FIG. 1), the threaded portion of the fixing nut (300) may be formed on the inner circumferential surface such that, when fastened to the second connecting portion (230) of the fitting body (200), the engaging end of the threaded portion of the fixing nut (300) is at a depth spaced apart from the first connecting portion (210) and proximate to the end of the fixing nut (300) that faces away from the fitting body (200).

As another example, when the ferrule seating portion (250) is spaced apart from the first connecting portion (210) and in contact with the second connecting portion (230) (as shown in FIG. 2), the threaded portion of the fixing nut (300) may be formed on an inner circumferential surface such that, when fastened to the second connecting portion (230) of the fitting body (200), the engaging end of the threaded portion is proximate to the first connecting portion (210) and also proximate to the end of the fixing nut (300) that faces the fitting body (200).

According to an embodiment, an inclined pressure surface (310) is formed on the inner circumferential surface of the fixing nut (300) proximate to its threaded portion, and rotating the fixing nut (300) to be fastened to the fitting body (200) causes an external force to be applied to the pressing portion (450) of the force control ferrule (400), thereby causing the force control ferrule (400) to be compressed and deformed.

Next, some embodiments of the force control ferrule (400) will be described.

According to an embodiment, a force control ferrule (400) capable of being deformed by compression may be at the ferrule seating portion (250) between the outer circumferential surface of the fitting body (200) and the inner circumferential surface of the fixing nut (300).

The force control ferrule (400) may be pressed and deformed when an external force is applied due to the characteristic shape, and specifically, it can serve to fix the pipe (10) by pressing against the ferrule seating portion (250), and consequently the inner inclined surface (270), by being deformed in the direction (i.e. circumferentially inward) in which the diameter of the force control ferrule (400) is reduced by an external force applied toward the central axis of the force control ferrule (400).

According to an embodiment, the force control ferrule (400) is generally configured in a ring shape and have a seat (410), a bending groove (430), and a pressing portion (450) according to the shape of the inner circumferential surface.

By making the inner diameter of the force control ferrule (400) the same as the outer diameter of the ferrule seating portion (250), the seat (410) may serve to maintain the strength of the entire force control ferrule (400) while preventing the force control ferrule (400) from being separated after being fitted into the fitting body (200).

By being configured in the form of a groove that appears to be bent outward from the center of the force control ferrule (400), the bending groove (430) may serve to become the center of a moment in which the pressing portion (450), to be described later, is bent and deformed when the force control ferrule (400) receives an external force in the direction of the central axis.

By bending and deforming the bending groove (430) toward the central axis around the moment when an external force is applied in the direction of the central axis, as described above, the pressing portion (450) may serve to fix the pipe (10) inserted into the inner circumferential surface of the second connecting portion (230) by pressing into the ferrule seating portion (250) of the fitting body (200).

The force control ferrule (400) may have a characteristic shape as described above, and its standard may be provided in various ways according to embodiments.

Different thicknesses or materials of the seat (410), the bending groove (430), and the pressing portion (450) of the force control ferrule (400) can be applied such that the amount of locking torque can be tailored to various cases.

For example, the pipe (10) may be formed of various materials, and in the case of a hard pipe, the locking torque should be relatively high, and in the case of a soft pipe, the locking torque should be relatively low.

In addition, the amount of locking torque may be changed by the difference in diameter of the pipe (10) as well.

Conventionally, the torque wrench was used to lock with an appropriate amount of torque as described above to deal with such a case, but the present disclosure can facilitate locking with an appropriate amount of locking torque by inserting the force control ferrule (400) between the fitting body (200) and the fixing nut (300) that is most appropriate to each case.

For example, when a hard pipe is inserted, a force control ferrule (400) having a material and thickness capable of applying a strong torque is inserted to achieve a strong locking, and when a soft pipe is inserted, a force control ferrule (400) that achieves a relatively weak locking may be inserted.

When a force control ferrule (400) suitable for a different amount of locking torque is inserted, it may be locked with an appropriate locking torque if the fixing nut (300) is rotated as much as possible to come into contact with the first connecting portion (210) of the fitting body (200).

Due to this configuration, the user can easily achieve locking with an appropriate torque without a torque wrench just by locking the fixing nut (300) as much as possible.

Additionally, as previously mentioned, one end of the pipe (10) to be inserted into the second connecting portion (230) of the fitting body (200) may further comprise an expanded portion (11) that is closely coupled to the inclined flare surface (110) of the flare socket (100). Alternatively, before the flare socket (100) is inserted into the first connecting portion (210), the end of the pipe (10) that is not expanded (i.e. opposite end from the expanded end (11)) may be inserted through the first connecting portion (210) until its expanded portion (11) abuts the inner inclined surface (270).

According to an embodiment, an end of the pipe (10) may be expanded to form the expanded portion (11) that has a diameter relatively larger than the diameter of the pipe (10) just prior to use with the pipe fitting apparatus. In another embodiment, the pipe (10) may already have an expanded portion (11).

According to an embodiment, the inclined flare surface (110) of the flare socket (100) is formed to come in contact with the inner inclined surface (270) of the fitting body (200), and a method of inserting a packing material that is separate from pipe 10 is used to prevent sealing from failing due to abrasion or damage caused by contact.

However, by using a pipe (10) that already has the expanded portion (11) that is or can be inclined at an angle that coincides with the inclined flare surface (110) of the flare socket (100) and the inner inclined surface (270) of the fitting body (200), the separate packing material would not be needed.

Using the components described above, a method for fitting with an appropriate locking torque using a pipe (10) fitting apparatus will be described. The sequence of the steps may be changed unless it is indicated otherwise or not practicable.

According to an embodiment, an expanded portion (11) may be formed at the end of the pipe (10) as an optional first step in case the pipe (10) does not already have an expanded portion. The pipe (10) is inserted into the fitting body (200) such that the expanded portion (11) of the pipe (10) comes into contact with the inner inclined surface (270).

According to an embodiment, the flare socket (100) is rotatably coupled into the first connecting portion (210) of the fitting body (200). According to an embodiment, the fitting body (200) and the flare socket (10X) may be rotatably coupled by using a wrench on the polygonal outer circumferential surface of the first connecting portion (210).

According to an embodiment, the force control ferrule (400) is slid onto the ferrule seating portion (250) of the fitting body (200) such that the seat (410) abuts the wall surface at the end of the ferrule seating portion (250). According to an embodiment, a force control ferrule (400) capable of applying an appropriate amount of torque required for locking the inserted pipe (10) is selected according to the factors such as characteristics of the pipe (10) and outer diameter of the ferrule seating portion (250) as discussed previously.

The force control ferrule (400) is installed so that the seat (410) is in close contact with both the vertical and horizontal surfaces formed on the ferrule seating portion (250).

The fixing nut (300) is rotatably coupled to the second connecting portion (230) of the fitting body (200). The fitting body (200) and the fixing nut (300) may be screwed together by rotating the polygonal outer circumferential surface of the fixing nut (300) using a wrench and so forth, and as the locking is performed, the distance between the first connecting portion (210) and the fixing nut (300) of the fitting body (200) gradually decreases. According to an embodiment, the force control ferrule (400) may be inserted into the fixing nut (300), and the fixing nut (300) which has the force control ferrule (400) nested in its cavity may then be rotatably coupled to the second connecting portion (230).

In the force control ferrule (400), as the fixing nut (300) gets locked, the pressing portion (450) gets bent in the direction of the central axis of the pipe (10) with the bending groove (430) as the center of the moment, the ferrule seating portion (250) of the fitting body (200) is pressed by the bending of the pressing portion (450), and the outer surface of the pipe (10) and the expanded portion (11) are consequently pressed by the ferrule seating portion (250).

When the ferrule seating portion (250) is pressed in the direction of the central axis to fix the pipe (10), the inner inclined surface (270) of the fitting body is pressed toward the inclined flare surface (110), and therefore, ultimately, the inclined flare surface (110) of the flare socket (100) and the expanded portion (11) of the pipe (10) and the inner inclined surface (270) of the fitting body (200) get tightly coupled; and since the fixing nut (300) is locked at a position where an appropriate locking torque set in advance is achieved by the force control ferrule (400) as described above, the locking can be achieved in a manner that the flare socket (100) or the pipe (10) does not get damaged while sealing is achieved by being pressurized to an appropriate pressure.

According to an embodiment, the first connecting portion (210) and the fixing nut (300) of the fitting body (200) have the same polygonal outer circumferential surface, and have the same outer diameter as described above, so the outer circumferential surface may be located on the same plane.

By allowing the center of the flat surface formed on the outer circumferential surface of the fixing nut (300) and the outer circumferential surface of the first connecting portion (210) to be aligned at the same level, and the fixing nut (300) to be locked as much as possible, the locking can be completed with an appropriate amount of torque.

Figure 5:
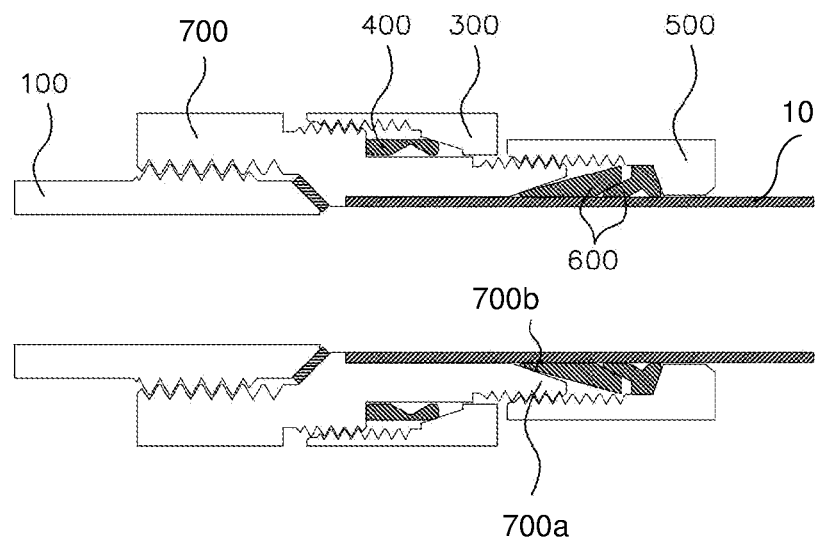
FIG. 5 is a section view of a pipe fitting apparatus providing easy locking with an appropriate torque according to another embodiment of the present disclosure.
Figure 6:
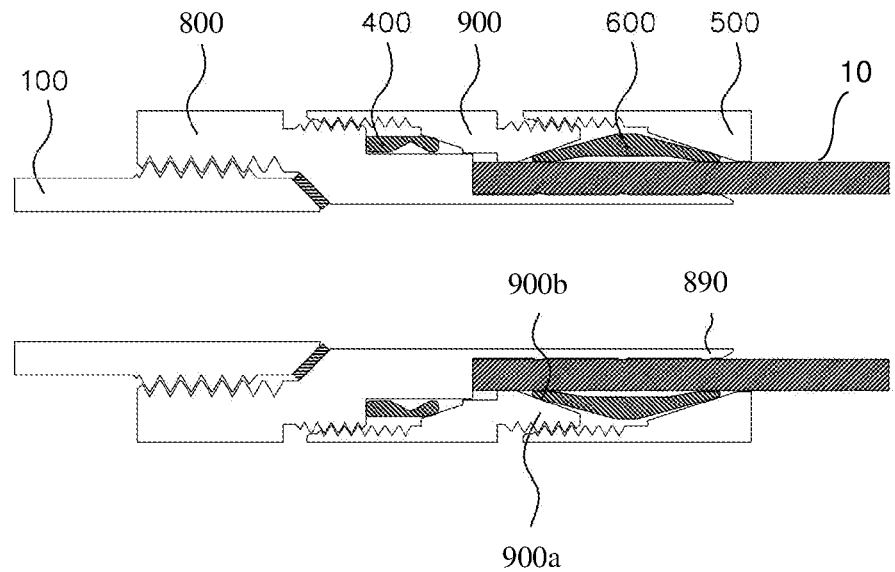
FIG. 6 is section view of a pipe fitting apparatus providing easy locking with an appropriate torque according to another embodiment of the present disclosure.

FIGS. 5 and 6 illustrate embodiments to achieve further locking.

To explain in detail, with reference to FIG. 5, the flare socket (100), the fixing nut (300), and the force control ferrule (400) are provided in a manner similar to or same as in FIGS. 1 and 2, but a fitting body (700) is provided to facilitate the further locking by a locking nut (500) and a locking ferrule (600). With reference to FIG. 6, the flare socket (100), and the force control ferrule (400) are provided in a manner similar to or same as in FIGS. 1 and 2, but a fixing fitting body (900) (rather than fixing nut (300)) is provided to facilitate the further locking, and in the case of a soft pipe, a fitting body (800) with a insertion guide (890) is further provided to facilitate the further locking.

The locking ferrule (600) abuts at least one inner surface of the locking nut (500) (abuts two inner surfaces of the locking nut (500) in FIG. 5, and abuts one inner circumferential surface of the locking nut (500) in FIG. 6) and inserted and installed in the locking connecting portions ((700a) in FIG. 5, and (900a) in FIG. 6) to be described later, and being deformed into an outer surface of the pipe (10) when radial pressure is applied toward the locking connecting portions ((700a) according to an embodiment in FIG. 5, and (900a) according to an embodiment in FIG. 6) by the locking nut (500) as the locking nut (500) is being tightened toward the fitting body (700) according to an embodiment in FIG. 5 and toward the fixing fitting body (900) according to an embodiment in FIG. 6. According to an embodiment, locking ferrule (600) may be formed as a monolithic structure (see locking ferrule (600) of FIG. 6) or a combination of structures (see e.g. locking ferrule (600) of FIG. 5).

With respect to an embodiment according to FIG. 5, the locking ferrule (600) may be a combination of two ferrules, a front ferrule and a rear ferrule. The front ferrule has a first end that is sloped for engaging an inclined locking surface (700b) that is at the end of the fitting body (700) and that is on the side that is opposite to the first connecting portion of the fitting body (700), to apply radial pressure at a first lateral location on the outer surface of the pipe (10), and a second end having an inclined pressure surface which forms a cavity (when engaged with the pipe (10)). The rear ferrule has a first end for engaging the inclined pressure surface of the second end of the front ferrule to apply radial pressure at a second lateral location on the outer surface of the pipe (10), and the second end which abuts against the locking nut (500). With respect to an embodiment according to FIG. 5, tightening the locking nut (500) toward the fitting body (700) causes the locking nut (500) to push against the second end of the rear ferrule, which in turn causes the first end of the rear ferrule to engage the inclined pressure surface of the second end of the front ferrule, which in turn causes the first end of the front ferrule to engage the inclined locking surface (700b) at the end of the fitting body (700) that is on the side that is opposite to the first connecting portion of the fitting body (700). The fitting body (700) has a structure similar to fitting body 200, but the end that is opposite to the first connecting portion of the fitting body (700) (i.e. the end where the pipe (10) is inserted) is extended to further have a locking connecting portion (700a) for engaging with the locking nut (500). The outer surface of the locking connecting portion (700a) has outer-facing screw threads for coupling with the locking nut (500) which has a corresponding inner-facing threaded portion. The inclined locking surface (700b) is formed at the inner-facing surface of the locking connecting portion (700a). Embodiments in which the locking connecting portion (700) is formed on the fitting body (700) may be applicable in the case of a hard pipe where the pipe (10) itself can support the applied pressure.

With respect to an embodiment according to FIG. 6, a locking ferrule 600 is provided as a monolithic ferrule having a chevron or are shape with two opposite inclines such that the opposite lateral ends of the locking ferrule (600) apply radial pressure on the pipe (10) as the locking nut (500) is tightened to the fixing fitting body (900). Fixing fitting body (900) according to an embodiment has a first portion facing and engaging the fitting body (800) which is similar to the fixing nut 200, and a second portion that has a locking connecting portion (900a) formed at the end where the pipe (10) is inserted. The outer surface of the locking connecting portion (900a) has outer-facing screw threads for coupling with the locking nut (500) which has a corresponding inner-facing threaded portion. The inclined locking surface (900b) is formed at the inner-facing surface of the locking connecting portion (900a).

The locking nut (500) has a screw thread formed on the inner circumferential surface, and by being screwed to the outer circumferential surface of the locking connecting portions (700a, 900a) described above, it can serve to apply pressure to said locking ferrule (600) toward the locking connecting portions (700a, 900a) when locking.

Embodiments in which a locking connecting portion (900a) is formed on a fixing fitting body (900), unlike the case like FIG. 5 where the locking connecting portion (700a) is formed on the fitting body (700) described above as being applicable to a hard pipe, may be applicable when a soft pipe is inserted.

In the case of a soft pipe, the pipe (10) cannot support the applied pressure by itself when fixing by applying pressure by the locking ferrule (600), so an insertion guide (890), in which one end of the fitting body (800) is extended to be inserted into the inner circumferential surface of the soft pipe, may be further provided.

The embodiments described above are merely exemplary, and other embodiments modified therefrom in various ways will be possible for a person with ordinary skill in the art.

Therefore, the true scope of technical protection of the present disclosure should include not only the embodiments described above but also other embodiments that are modified in various ways by the technical idea of the disclosure described in the scope of claims below.

DESCRIPTION OF REFERENCE NUMERALS

10: Pipe
11: Expanded portion
100: Flare socket
101: Threaded portion
110: Inclined flare surface
200: Fitting body
210: First connecting portion
211: Inner inclined surface
230: Second connecting portion
250: Ferrule seating portion
270: Inner inclined surface
300: Fixing nut
310: Inclined pressure surface
400: Force control ferrule
410: seat
430: Bending groove
450: Pressing portion
500: Locking nut
600: Locking ferrule
700: Fitting body
700a: Locking connecting portion
700b: Inclined locking portion
800: Pitting body
890: Insertion guide
900: Fixing fitting body
900a: Locking connecting portion
900b: Inclined locking portion

What is claimed is:

1. A pipe fitting apparatus, comprising:
a fitting body comprising a first connecting portion having an inner threaded surface at a first end, a second connecting portion having an outer threaded portion, a ferrule seating portion on an outer surface of the fitting body adjacent to the outer threaded portion, and an inner inclined surface between a first inner cavity portion corresponding to the first connecting portion and a second inner cavity portion corresponding to the second connecting portion such that a diameter of the first inner cavity is wider than a diameter of the second inner cavity, the second connecting portion located between the first connecting portion and the ferrule seating portion;
a force control ferrule directly on the ferrule seating portion of the fitting body; and
a fixing nut comprising an inner threaded portion for rotatably engaging with the second connecting portion of the fitting body and an inclined pressure surface for abutting against the force control ferrule.

2. The pipe fitting apparatus according to claim 1, wherein an outer circumferential surface of the fitting body comprises a polygonal outer cross-sectional shape.

3. The pipe fitting apparatus according to claim 1, further comprising a locking nut and a locking ferrule, wherein a second fitting body further comprises a locking connecting portion having an outer threaded portion for engaging with the locking nut and an inclined locking portion for engaging with the locking ferrule.

* * * * *